(12) United States Patent
Natu et al.

(10) Patent No.: US 8,843,732 B2
(45) Date of Patent: Sep. 23, 2014

(54) MECHANISM FOR DETECTING A NO-PROCESSOR SWAP CONDITION AND MODIFICATION OF HIGH SPEED BUS CALIBRATION DURING BOOT

(75) Inventors: Mahesh S. Natu, Sunnyvale, CA (US); John V. Lovelace, Irmo, SC (US); Rajesh P. Banginwar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 12/643,108

(22) Filed: Dec. 21, 2009

(65) Prior Publication Data

US 2011/0154006 A1 Jun. 23, 2011

(51) Int. Cl.
```
G06F 9/24       (2006.01)
G06F 15/177     (2006.01)
G06F 1/24       (2006.01)
G06F 21/85      (2013.01)
G06F 21/57      (2013.01)
G06F 21/74      (2013.01)
```
(52) U.S. Cl.
CPC .............. *G06F 21/74* (2013.01); *G06F 21/85* (2013.01); *G06F 21/575* (2013.01)
USPC ......... 713/2; 713/1; 713/100; 702/85; 702/90

(58) Field of Classification Search
USPC ............................. 713/1, 2, 100; 702/85, 90
See application file for complete search history.

(56) References Cited

U.S. PATENT DOCUMENTS

| 6,957,332 | B1 | 10/2005 | Ellison | |
|---|---|---|---|---|
| 7,237,121 | B2 | 6/2007 | Cammack et al. | |
| 2003/0084307 | A1 | 5/2003 | Schwartz | |
| 2006/0047939 | A1* | 3/2006 | Devins et al. | 713/2 |
| 2007/0130434 | A1* | 6/2007 | Chu et al. | 711/163 |
| 2007/0186091 | A1* | 8/2007 | Yang et al. | 713/2 |
| 2008/0184022 | A1* | 7/2008 | Peacock | 713/2 |
| 2010/0262891 | A1 | 10/2010 | Catalano et al. | |

OTHER PUBLICATIONS

Int'l Search Report and Written Opinion for PCT Application No. PCT/US2010/055454 mailed Jul. 15, 2011, 8 pgs.

\* cited by examiner

*Primary Examiner* — Michael J Brown
(74) *Attorney, Agent, or Firm* — Blakely, Sokoloff, Taylor & Zafman LLP

(57) ABSTRACT

Memory channel training parameters are function of electrical characteristics of memory devices, processor(s) and memory channel(s). Training steps can be skipped if the BIOS can determine that the memory devices, motherboard and processor have not changed since the last boot. Memory devices contain a serial number for tracking purposes and most motherboards contain a serial number. Many processors do not provide a mechanism by which the BIOS can track the processor. Described herein are techniques that allow the BIOS to track a processor and detect a swap without violating privacy/security requirements.

17 Claims, 5 Drawing Sheets

MECHANISM FOR DETECTING A NO-PROCESSOR SWAP CONDITION AND MODIFICATION OF HIGH SPEED BUS CALIBRATION DURING BOOT

TECHNICAL FIELD

Embodiments of the invention relate to high frequency bus calibration techniques. More particularly, embodiments of the invention relate to mechanisms to determine whether a processor or processor core has been removed from a host platform and modification of high frequency channel calibration during boot based on the determination.

BACKGROUND

The personal computer and server industries generally require a 20-40% yearly performance gain across many workload types in order to be competitive. Various mechanisms are used to provide these levels of performance gains including, for example, core count increases and memory size/bandwidth/latency improvements. Memory improvements typically take the form of faster dynamic random access memory (DRAM), higher DDR (Double Data Rate) bus frequencies, larger capacity dual inline memory modules (DIMMs), more DIMMs per channel and other optimizations. Similarly, multi-socket system performance improvements require faster and better interconnects between the processors.

Higher DDR speed and DIMM counts require that DRAM channels be carefully tuned for optimum signal quality and bus timing. This tuning is performed by basic input/output system (BIOS) during boot up and is commonly referred to as "DDR training" DDR training includes many time consuming steps, for example, centering of various strobe signals, cross talk elimination and reference voltage calibration. These calibration steps are used to derive optimal DDR timing parameters that are applied to the DRAM controller and DIMMs. This programming is done before memory is accessed as these parameters cannot be updated during operation without disturbing memory traffic.

Non-optimum parameters result in higher bit error rates and generally destabilize system operation. These complex calibration steps result in increased boot time. Current DDR-4 proposals call for per DDR device calibration across multiple parameters to achieve higher speeds and lower voltages. As a result, memory training processes in these platforms may be increased.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
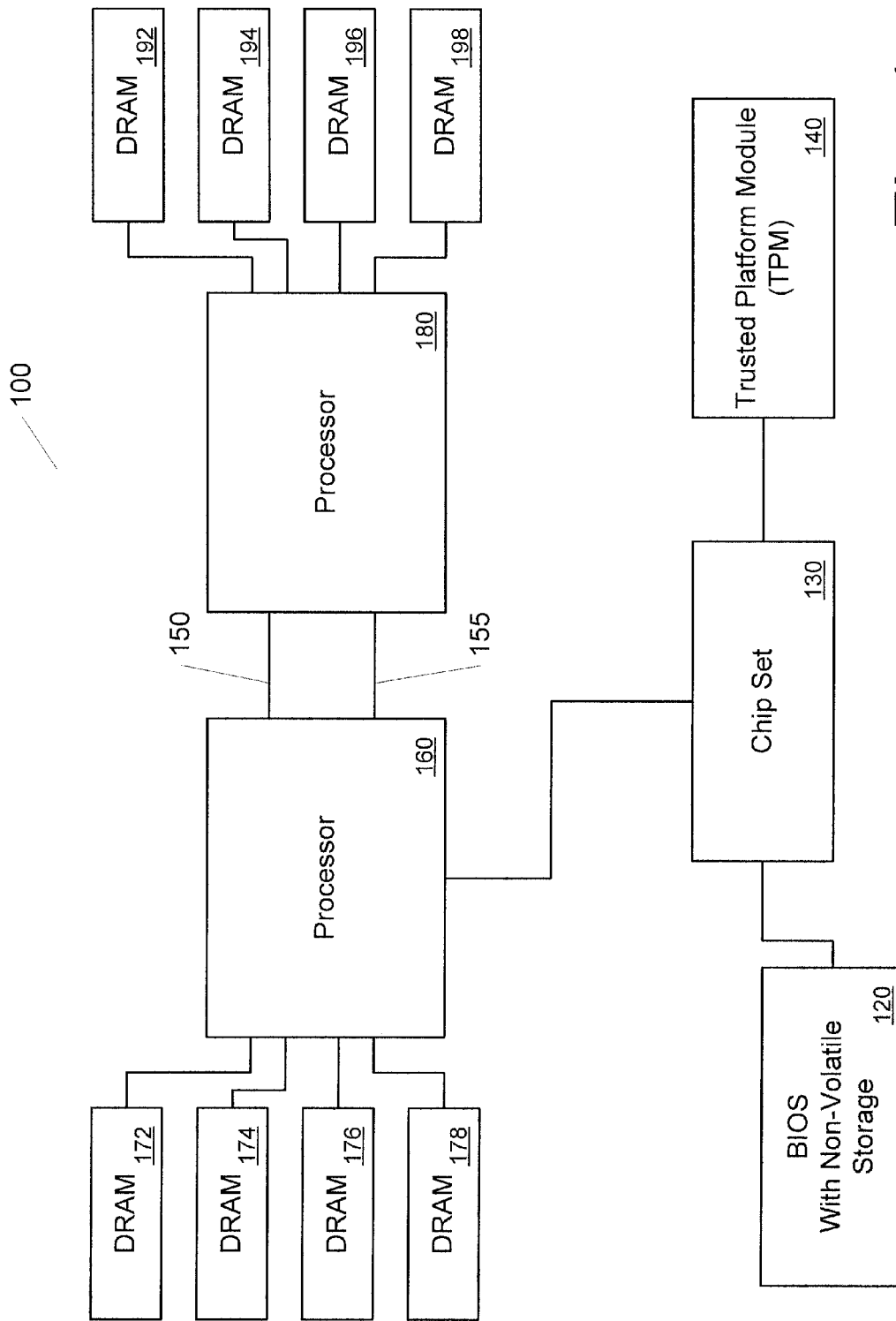
FIG. 1 is a block diagram of one embodiment of an electronic system in which a mechanism may be provided to determine a processor identifier securely.

In the following description, numerous specific details are set forth. However, embodiments of the invention may be practiced without these specific details. In other instances, well-known circuits, structures and techniques have not been shown in detail in order not to obscure the understanding of this description.

"Time to video" is a key usability metric. If the platform fails to post video within 10 seconds of powering up, users may believe that the platform is malfunctioning. For that reason, platform manufacturers often require a time to video of less than 10 seconds. As system complexity increases, this requirement may become more difficult to achieve. Described herein are techniques by which BIOS may eliminate some or all DDR training steps from most boot cycles and allow improved time to video metrics.

DDR training parameters are function of electrical characteristics of memory DIMMs, processor(s) and DRAM channel(s). The training steps can be skipped if the BIOS can determine that the DIMMs and processor have not changed on the motherboard since the last boot. Memory DIMMs are required to contain a serial number for tracking purposes and most motherboards contain a serial number such as Wired for Management (WfM) Globally Unique Identifier (GUID). Some platforms may place additional components (e.g. buffers) or cards in the memory channel path. These components or memory cards plugged into the connectors can also carry a serial number. As a result, the BIOS can track memory DIMMs, buffers, and motherboard and memory cards.

However, many processors do not provide a mechanism by which the BIOS can track the processor. Even if the processors have a serial number, for example, for manufacturing tracking purposes, this serial number is generally not exposed to BIOS due to privacy/security concerns. Described herein are techniques that allow the BIOS to utilize the serial number of a processor without violating privacy/security requirements. Some systems may have other components with similar privacy requirements and solutions proposed here can be extended to handle those components.

In operational situations, processor swapping is rare, but lack of a detection mechanism requires the BIOS to operate on worst case assumptions and perform calibration procedures each time the system is booted up. Thus, the detection mechanisms described herein may allow the BIOS to eliminate DDR training for most boot processes and provide faster boot times and faster time to video times.

In one embodiment, the processor identification mechanism utilizes an Intel® Trusted eXecution Technology (TXT) AC Module (ACM) and Intel® TXT hardware to determine the serial number for processor(s) of the host platform. The ACM is a binary module that is delivered and cryptographically signed by the manufacturer (e.g., Intel®). The processor authenticates the ACM prior to launch using a public key embedded in the chipset. The ACM is executed from within the processor cache and is protected from modifications and snooping during execution.

The ACM has higher privileges than BIOS or ordinary software and can be considered a logical extension of processor microcode. The processor microcode has the ability to detect whether a processor is in AC Mode or not. Currently, this capability is used by processor microcode to expose TXT-privileged operations (e.g., unlock memory) to the ACM via a machine state register (MSR) interface. The mechanisms described herein utilize an ACM-only MSR (e.g., PSN_ACM_MSR) that exposes the processor serial number information to the ACM only. In one embodiment, if ordinary software attempts to access the processor serial number by reading the MSR, the processor microcode generates a general protection fault (GPF).

In one embodiment, a Trusted Platform Module (TPM) may be utilized. The TPM provides non-volatile (NV) storage for cryptographic operations. The TPM is soldered on the motherboard and is thus physically tied to the platform. The TPM supports multiple privilege levels known as "locality." The ACM has access to locality 3. Ordinary software including BIOS and the host operating system (OS), does not have access to this locality.

Currently the ACM uses locality 3 NV storage to store parameters that need to be protected from BIOS and the OS. As described herein, the ACM can store the processor serial number(s) obtained by reading the MSR in locality 3 NV storage. The ACM provides a MatchCPU( ) function that can be invoked by the BIOS. When this function is invoked, the ACM can read the CPU MSR through, for example, PSN_ACM_MSR and compare it with serial numbers stored in TPM NV memory. If the serial numbers match, the ACM can return success indicating no processor swap has occurred.

In a multi-processor (MP) system, the BIOS can repeat this procedure for each processor. Because the comparison is performed by the ACM, the serial number is not exposed to the software that invokes the ACM, which satisfies many privacy/security guidelines. If the BIOS can determine, through this process, that the processor(s) and DIMMs have not changed since the last calibration process, the BIOS can skip the DDR calibration process.

There are other uses for which the mechanisms described herein may be utilized. Faster connections (e.g., Quick Path Interconnect or QPI) may require similar training steps that can negatively impact boot time and/or time to video. Similar to DDR training, QPI training parameters are a function of motherboard and processor(s) and the ends of the interconnect. The mechanisms described herein can be utilized by the BIOS to reduce or eliminate QPI calibration steps for systems in which there has been no change to the processor(s).

In server platforms, platform software can disable one or more processor cores in a processor based on, for example, failure history. When such a processor is replaced by a new processor, the platform software is expected to re-enable the replaced processor core(s). The techniques described herein may be utilized to determine when the processor core(s) have been replaced. Other uses of these mechanisms can also be provided.

FIG. 1 is a block diagram of one embodiment of an electronic system in which a mechanism may be provided to detect a processor identifier change that utilizes an ACM, but does not expose the identifier to general purpose software. The example of FIG. 1 includes two processors; however, the techniques described herein are equally applicable to single processor systems as well as systems with more then two processors. In one embodiment, the non-memory components (i.e., processors, chipset, TPM, BIOS) of electronic system 100 are available from Intel Corporation. In alternate embodiments, components that are compatible with the Intel Architecture may be utilized. In other alternate embodiments, processors that provide security to processor identifiers may be utilized.

In response to a reset condition or a power up condition, BIOS 120 may begin the initialization or boot up process. While the boot up process may include many functions, one aspect is the calibration of memory channels. In one embodiment, processors 160 and 180 support TXT or a similar level of security. Processors 160 and 180 are coupled to BIOS 120 and Trusted Platform Module (TPM) 140 via chip set 130. In one embodiment, processor 180 is coupled with chip set 130 via processor 160. Processor 160 and processor 180 may be interconnected with various interconnection protocols, for example, QPI.

In electronic system 100, processor 160 is coupled with dynamic random access memories (DRAMs) 172, 174, 176 and 178 and processor 180 is coupled with DRAMs 192, 194, 196 and 198. In one embodiment, the channels between processors 160 and 180 and DRAMs 172, 174, 176, 178, 192, 194, 196 and 198 are Double Data Rate (DDR) and can be any generation of DDR memory channel (e.g., DDR1, DDR2, DDR3, DDR4).

In one embodiment, as part of the boot process the ACM is transferred from BIOS 120 through chip set 130 to processor 160 for execution. In one embodiment, ACM execution occurs within the TXT environment of processor 160. As execution of the ACM progresses, the ACM may determine the identifier (e.g., serial number) of processor 160 and/or processor 180. In one embodiment the ACM request for the processor identifier occurs within the TXT environment and requests that the identifier be returned to an ACM-only register. As a result, the identifier remains within the secure TXT environment and remains shielded from general purpose software.

In one embodiment, there exists a protected channel between processor 160 and TPM 140 through chip set 130. TPM 140 may store a copy of a processor identifier from a previous boot process. The copy stored by TPM 140 may be used for comparison purposes for the current boot process. In one embodiment, there is a protected channel to a Locality 3 storage location in TPM 140 that is used to pass processor identifier(s) for comparison purposes. In one embodiment, the protected channel is opened and closed by micocode executed by processor 160.

The results of the comparison are utilized by the ACM and BIOS 120 to determine whether to perform a full boot up that includes memory channel calibration process. That is, if the processor identifiers match, the ACM and/or BIOS 120 may skip the memory channel calibration process. If the processor identifiers do not match, the new processor identifier may be stored in TPM 140 and the memory channel calibration process may be performed.

Another use of the processor identifiers may be for the interconnection(s) between processor 160 and processor 180. If the processor identifiers for both processor 160 and 180 match the previous boot up, calibration of links 150 and 155 may be skipped. If one of the processor identifiers for processor 160 or processor 180 does not match the previous boot up, calibration links 150 and 155 may be performed.

Figure 2:
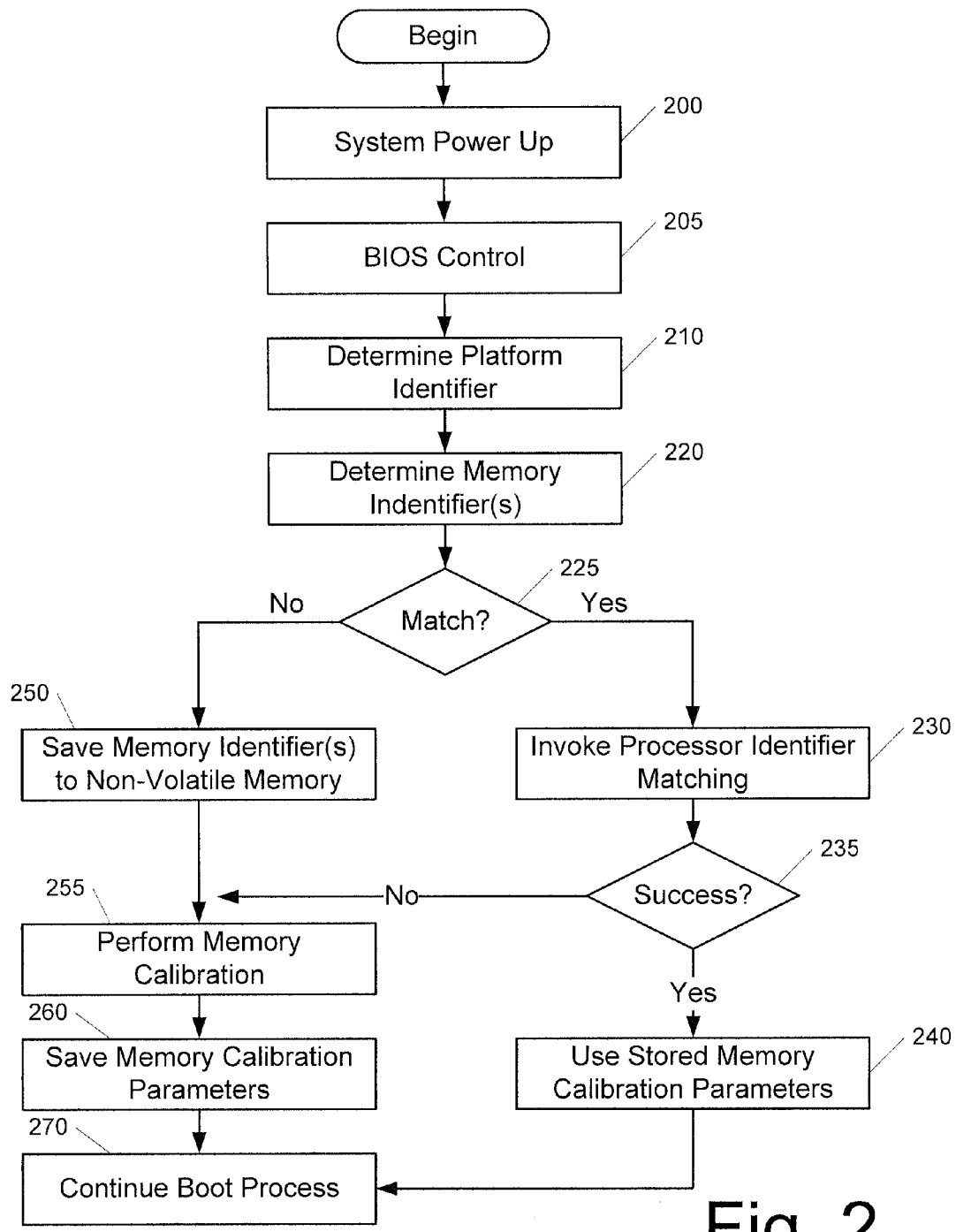
FIG. 2 is a flow diagram of one embodiment of a boot process may utilize a processor identifier to determine whether to perform memory channel calibration as part of a boot process.

FIG. 2 is a flow diagram of one embodiment of a boot process may utilize a processor identifier to determine whether to perform memory channel calibration as part of a boot process. The boot process of FIG. 2 may be applied to a system such as the system of FIG. 1.

The system is powered up, 200. In response to the power up condition, the BIOS of the system gains control of the system, 205. As discussed above, the BIOS manages the boot up process of the host system. The platform identifier is determined, 210. The platform identifier is not a secure identifier and can be determined in any manner known in the art.

Identifiers for each memory component are determined, 220. In one embodiment, each DRAM chip has an identifier that is not secure. The memory identifiers can be determined in any manner known in the art. The system can then determine wither the gathered identifiers match with previously stored identifiers, 225.

If the identifiers to not match, 225, the memory identifiers are saved in a non-volatile memory for a subsequent boot process, 250. A full memory calibration is performed, 255. The memory calibration parameters are saved, 260, and the boot process continues, 270.

If the identifiers match, 225, processor identifier matching is invoked, 230. One embodiment, of a technique for processor identifier retrieval and matching is described with respect to FIG. 3. If processor identifier matching is successful, 235, the stored memory calibration parameters are utilized, 240. If processor identifier matching is not successful, 235, memory calibration is performed, 255. The memory calibration parameters are saved, 260, and the boot process continues, 270.

Figure 3:
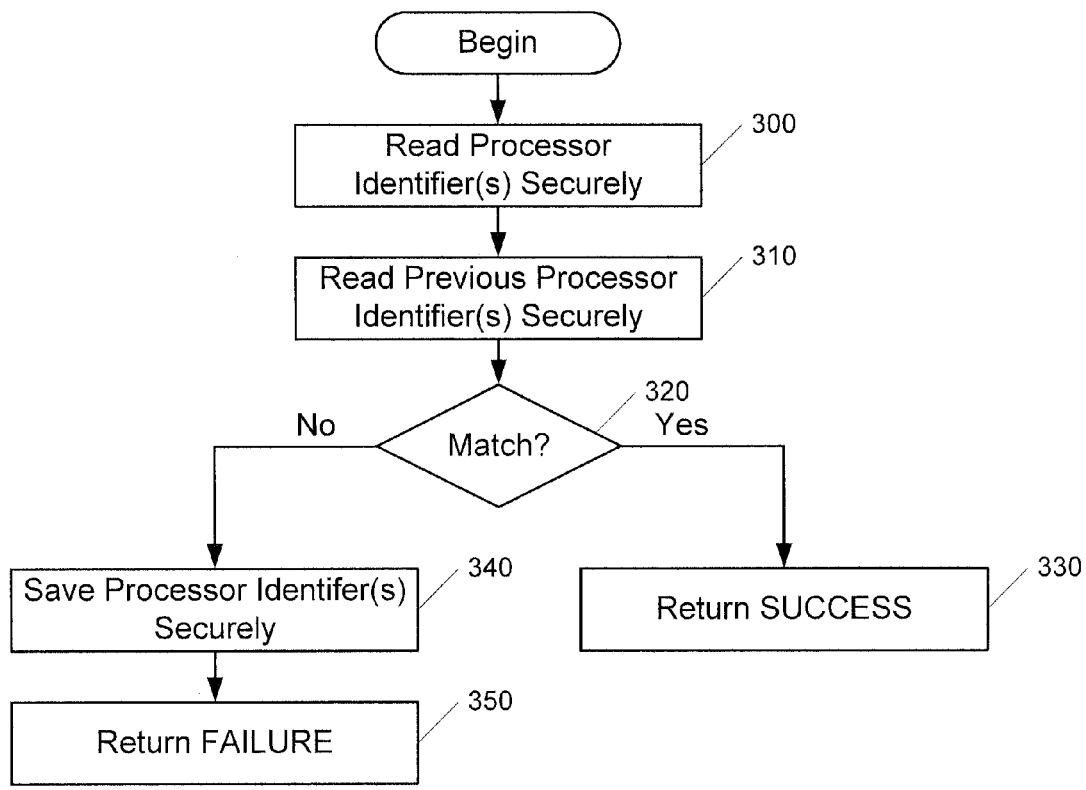
FIG. 3 is a flow diagram of one embodiment of a process to determine a whether processor identifier has changed across boot without exposing the identifier to general purpose software.

FIG. 3 is a flow diagram of one embodiment of a process to determine a processor identifier in a secure manner. The process of FIG. 3 can be called by BIOS using TXT instructions, which instruct the microcode to launch ACM inside a shielded environment. In response to a call from execution of the ACM, the processor identifier(s) are read securely, 300. In one embodiment, this may be accomplished by secure microcode operations that retrieve the processor identifier(s) and utilize an ACM-only machine specific register a.k.a. MSR (e.g., PSN_ACM_MSR) that exposes the processor serial number information to the ACM only.

The processor identifier(s) from the previous boot is read from memory that is shielded from general purpose software, 310. In one embodiment, the previous processor identifier(s) are stored in a Locality 3 non-volatile memory in a TPM. In alternate embodiments, other secure mechanisms may be utilized to store the processor identifier(s). The processor identifiers from the current boot operation and compared to the stored processor identifier(s), 320.

If the processor identifier(s) match, 320, a SUCCESS indication is returned to the calling function, 330. If the processor identifier(s) do not match, 320, the new processor identifier(s) are saved in a secure storage, 340. In one embodiment, the processor identifier(s) are stored in a Locality 3 non-volatile storage. A FAILURE indication is then returned to the calling function, 350. In no case, the calling function, which is part of BIOS, learns about the actual processor identifiers.

Figure 4:
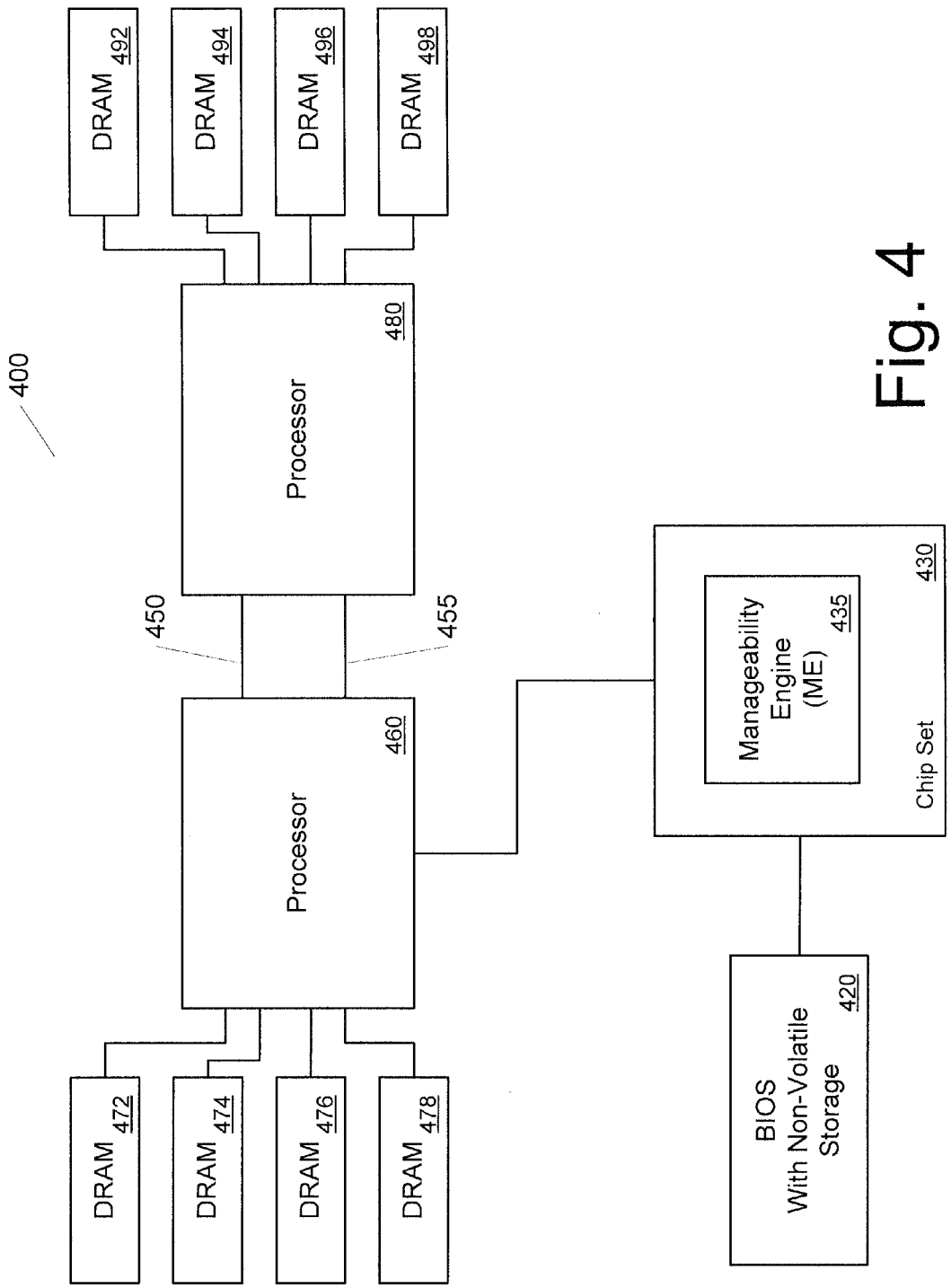
FIG. 4 is a block diagram of one embodiment of an electronic system in which a mechanism may be provided to determine a processor identifier securely utilizing an Intel Manageability Engine.

FIG. 4 is a block diagram of one embodiment of an electronic system in which a mechanism may be provided to determine a processor identifier securely utilizing an Intel Manageability Engine (ME). Platforms that do not support TXT or may not contain TPM, can benefit from using this alternate ME based solution. In one embodiment, the ME executes firmware that is delivered and cryptographically signed by its manufacturer (e.g., Intel Corporation).

In response to a reset condition or a power up condition, BIOS 420 may begin the initialization or boot up process. While the boot up process may include many functions, one aspect is the calibration of memory channels. In one embodiment, processors 460 and 480 support TXT or a similar level of security. Processors 460 and 480 are coupled to BIOS 420 via chip set 430, which includes ME 435. In one embodiment, processor 480 is coupled with chip set 430 via processor 460. Processor 460 and processor 480 may be interconnected with various interconnection protocols, for example, QPI.

In electronic system 400, processor 460 is coupled with dynamic random access memories (DRAMs) 472, 474, 476 and 478 and processor 480 is coupled with DRAMs 492, 494, 496 and 498. In one embodiment, the channels between processors 460 and 480 and DRAMs 472, 474, 476, 478, 492, 494, 496 and 498 can be any generation of DDR memory channel (e.g., DDR1, DDR2, DDR3, DDR4).

In one embodiment, chipset 430 authenticates ME firmware 435 using a public key embedded in chipset 430, prior to launch. In alternate embodiments, ME firmware 435 may be authenticated in a different manner. In one embodiment, ME firmware runs in a ME execution environment inside chipset 430 and is protected from modifications and snooping by host software. In one embodiment, ME firmware 435 has a secure path to processor 460 through chipset 430 and uses the secure path to obtain processor identifier(s), PSN.

In one embodiment, the ME subsystem contains a Random Number Generator. ME firmware 435 can use this facility to create a random number R. ME firmware 435 can compute hash of R and PSN, H. In one embodiment, H=Hash (R, PSN) where Hash function represents a standard algorithm, for example, SHA-2. ME firmware 435 stores R and H in a non-volatile memory. In one embodiment, PSN is not directly stored in the non-volatile memory. Software can read the non-volatile memory contents and determine R and H. However, it is computationally infeasible to calculate PSN based on R and H since Hash functions are a one way functions.

In one embodiment, ME firmware 435 implements a MatchCPU( ) command that can be invoked by BIOS 420. When this command is invoked, ME firmware 435 can read the processor identifier(s) using secure interface, read R from the non-volatile memory and compute H1=Hash(R, PSN).

ME firmware 435 can compare H1 with H, the hash stored in the non-volatile memory. Hash functions are collision free. Therefore, Hash (R, PSN1)=Hash (R, PSN2) implies PSN1=PSN2. Therefore, H1=H implies that the serial number has not changed. In a multi-processor system, BIOS 420 can repeat this procedure for every processor. Because the comparison is performed by ME firmware 435, the processor identifier(s) are not exposed to the software meeting privacy and security guidelines.

Another use of the processor identifiers may be for the interconnection(s) between processor 460 and processor 480. If the processor identifiers for both processor 460 and 480 match the previous boot up, calibration of links 450 and 455 may be skipped. If one of the processor identifiers for processor 460 or processor 480 does not match the previous boot up, calibration links 450 and 455 may be performed.

Figure 5:
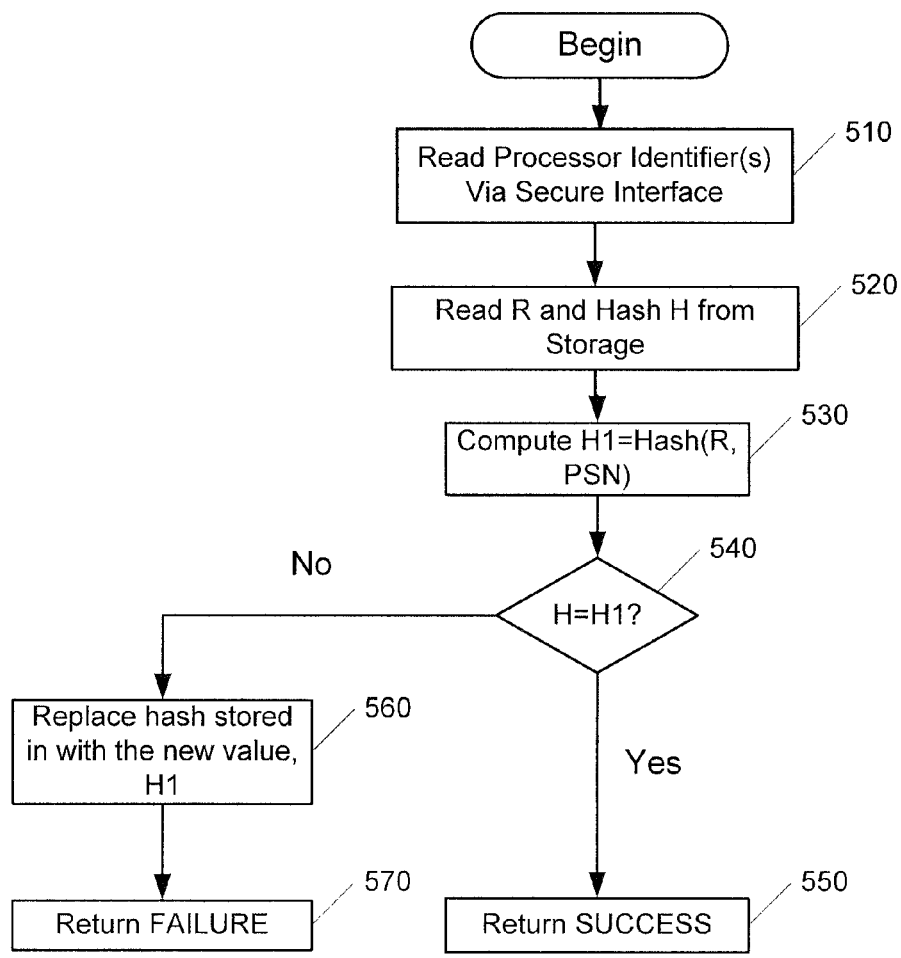
FIG. 5 is a flow diagram of one embodiment of a technique for comparing processor identifier(s) utilizing a Manageability Engine.

FIG. 5 is a flow diagram of one embodiment of a technique for comparing processor identifier(s) utilizing a Manageability Engine. In response to a call, the processor identifier(s) are determined via a secure interface, 510. The values of R and H are retrieved from memory, 520. A hash value, H1, is determined using the current R and processor identifier(s), PSN, 530.

The computed hash value, H1, is compared to the stored hash value, H, 540. If H and H1 are equal, 540, a SUCCESS indication is returned, 550. If the computed hash value, H1, and H are not equal, 540, the computed has value, H1, is stored in the secure memory, 560. A FAILURE indication is then returned, 570.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   determining identifiers for a plurality of memory devices in a host electronic system in response to a power on condition;
   performing memory channel calibration if the identifiers do not match identifiers from a previous boot up;
   determining an identifier for each of one or more processors of the host electronic system by invoking a protected function that retrieves the identifier of one or more processors within a shielded context, comparing, within the shielded context, the retrieved identifier to an identifier of one or more processors from the previous boot up, wherein the identifier from the previous boot up is stored in a protected memory location, returning a success indicator if the identifiers match, and returning a failure indicator if the identifiers to not match;
   determining whether the identifiers for each of the one or more processors match identifiers for a corresponding number of processors from the previous boot up via a secure process;
   completing the boot process without calibrating memory channels if the memory identifiers and the processor identifiers match memory identifiers and processor identifiers from a previous boot process.

2. The method of claim 1 further comprising:
   determining an identifier of a motherboard of the host electronic system; and
   performing memory channel calibration if the identifiers for the memory devices or the identifier for the mother board do not match corresponding identifiers from a previous boot up.

3. The method of claim 1 wherein determining the identifier of a motherboard of the host electronic system comprises determining a serial number for the motherboard.

4. The method of claim 1, wherein determining identifiers for the plurality of memory devices in the host electronic system in response to a power on condition comprises determining a serial number for each dynamic random access memory (DRAM) integrated circuit in the host electronic system.

5. The method of claim 1 wherein invoking the protected function to detect change in identifier of one or more processors comprises:
   calling an AC Module (ACM) function that reads the identifier within an ACM context and returns the identifier to a protected register;
   comparing the identifier stored in the protected register to the identifier from the previous boot that has been stored in a protected memory location in a secure module in the host electronic system, wherein the identifiers are transmitted via protected channels;
   wherein the identifiers are never exposed to a general purpose environment.

6. The method of claim 1 wherein invoking the secure function to retrieve the identifier of one or more processors comprises:
   reading the identifier within a shielded environment;
   generating a hash value for the identifier;
   retrieving a hash value for the identifier from the previous boot;
   comparing the hash values;
   wherein the identifiers are never exposed to a general purpose environment.

7. An article comprising a memory device embedded within a host electronic system having stored therein instructions that, when executed, cause one or more host electronic system components to:
   determine identifiers for a plurality of memory devices in a host electronic system in response to a power on condition;
   perform memory channel calibration if the identifiers do not match identifiers from a previous boot up;
   determine an identifier for each of one or more processors of the host electronic system by invoking a protected function that retrieves the identifier of one or more processors within a shielded context, comparing, within the shielded context, the retrieved identifier to an identifier of one or more processors from the previous boot up, wherein the identifier from the previous boot up is stored in a protected memory location, returning a success indicator if the identifiers match, and returning a failure indicator if the identifiers to not match;
   determine whether the identifiers for each of the one or more processors match identifiers for a corresponding number of processors from the previous boot up via a secure process;
   complete the boot process without calibrating memory channels if the memory identifiers and the processor identifiers match memory identifiers and processor identifiers from a previous boot process.

8. The article of claim 7 wherein the instructions further comprise instructions that, when executed, cause the one or more host electronic system components to:
   determine an identifier of a motherboard of the host electronic system; and
   perform memory channel calibration if the identifiers for the memory devices and the identifier for the mother board do not match corresponding identifiers from a previous boot up.

9. The article of claim 7 wherein the instructions that cause the one or more host system components to determine the identifier of a motherboard of the host electronic system comprises instructions that, when executed, cause the one or more host system components to determine a serial number for the motherboard.

10. The article of claim 7, wherein the instructions that cause the one or more host system components to determine identifiers for the plurality of memory devices in the host electronic system in response to a power on condition comprises instructions that, when executed, cause the one or more host system components to determine a serial number for each dynamic random access memory (DRAM) integrated circuit in the host electronic system.

11. The article of claim 7 wherein the instructions that cause the one or more host system components to invoke the secure function to retrieve the identifier of one or more processors comprises instructions that, when executed, cause the one or more host system components to:
   call an AC Module (ACM) function that reads the identifier and returns the identifier to a secure register;
   compare the identifier stored in the protected register to the identifier from the previous boot that has been stored in a protected memory location in a secure module in the host electronic system, wherein the identifiers are transmitted via secure channels;

wherein the identifiers are never exposed to a general purpose environment.

12. The article of claim 7 wherein the instructions that cause the one or more host system components to invoke the secure function to retrieve the identifier of one or more processors comprises instructions that, when executed, cause the one or more host system components to:

read the identifier in a secure environment;
generate a hash value for the identifier;
retrieve a hash value for the identifier from the previous boot;
compare the hash values;
wherein the identifiers are never exposed to a general purpose environment.

13. A system comprising:

a processor to selectively perform memory channel calibration operations;
one or more memory devices coupled with the processor via corresponding memory channels;
a chip set coupled with the processor;
a basic input/output system (BIOS) coupled with the chip set, wherein, in response to a power on condition to initiate a current boot process, the BIOS determines identifiers for a plurality of memory devices in a host electronic system in response to a power on condition, causes memory channel calibration operations to be performed by the processor if the identifiers do not match identifiers from a previous boot up, the BIOS further to determine an identifier of the processor via a secure process if the identifiers for the plurality of memory devices match identifiers from the previous boot up, the BIOS to complete the current boot process without calibrating memory channels if the memory identifiers and the processor identifier match memory identifiers from a previous boot process and processor identifiers from the previous boot process.

14. The system of claim 13, wherein the BIOS further determines an identifier of a motherboard of the system, and performs memory channel calibration if the identifiers for the memory devices or the identifier for the motherboard do not match corresponding identifiers from a previous boot up.

15. The system of claim 13, wherein determining if the identifier of the processor matches the identifier from the previous boot up without exposing the identifiers to general purpose software comprises:

invoking a protected function that retrieves the identifier of the processor within a shielded context;
comparing, within the shielded context, the retrieved identifier to an identifier of the processor from the previous boot up, wherein the identifier from the previous boot up is stored in a protected memory location;
returning a success indicator if the identifiers match; and
returning a failure indicator if the identifiers to not match.

16. The system of claim 15 wherein invoking the protected function to detect change in identifier of the processor comprises:

calling an AC Module (ACM) function that reads the identifier within an ACM context and returns the identifier to a protected register;
comparing the identifier stored in the protected register to the identifier from the previous boot that has been stored in a protected memory location in a secure module in the host electronic system, wherein the identifiers are transmitted via protected channels;
wherein the identifiers are never exposed to a general purpose environment.

17. The system of claim 15 wherein invoking the protected function to detect change in identifier of the processor comprises:

reading the identifier within a shielded environment;
generating a hash value for the identifier;
retrieving a hash value for the identifier from the previous boot;
comparing the hash values;
wherein the identifiers are never exposed to a general purpose environment.

* * * * *